United States Patent [19]
Hanson et al.

[11] Patent Number: 5,331,821
[45] Date of Patent: Jul. 26, 1994

[54] METHOD OF STARTING AND RUNNING AN INTERNAL COMBUSTION ENGINE CONNECTED TO A REFRIGERANT COMPRESSOR

[75] Inventors: Jay L. Hanson, Bloomington; Doyle G. Herrig, Elko; James E. Nixon, Woodbury; Gerald J. Ladendorf, Bloomington; Lowell B. Naley, Minnetonka; Norman F. Spear, Edina, all of Minn.

[73] Assignee: Thermo King Corporation, Minneapolis, Minn.

[21] Appl. No.: 114,723

[22] Filed: Aug. 31, 1993

[51] Int. Cl.⁵ .............................................. B60H 1/32
[52] U.S. Cl. .................................... 62/133; 62/228.4; 123/339
[58] Field of Search ............... 123/424, 681, 339, 340, 123/685, 686; 62/133, 228.4

[56] References Cited
U.S. PATENT DOCUMENTS 4,364,350 12/1982 Kobayashi et al. ............. 123/340 X
4,434,760 3/1984 Kobayashi et al. ................. 123/339
5,123,253 6/1992 Hanson et al. ........................... 62/89
5,140,826 8/1992 Hanson et al. ......................... 62/115
5,199,272 4/1993 Yamanaka et al. .................... 62/133

Primary Examiner—William E. Wayner

[57] ABSTRACT

A method of starting and running an internal combustion engine connected to drive a refrigerant compressor in a refrigeration system which operates the engine at predetermined first and second speeds in response to a predetermined control algorithm, with the first speed being lower than the second speed. The method includes the step of starting and running the engine at the first speed, preventing switching from the first to the second speed in response to the control algorithm during an initial dynamic delay period following the step of starting the engine. The method then includes the step of determining the length of the initial dynamic delay period as a function of at least one predetermined parameter of the engine, and selecting the at least one predetermined engine parameter during the initial dynamic delay period.

8 Claims, 3 Drawing Sheets

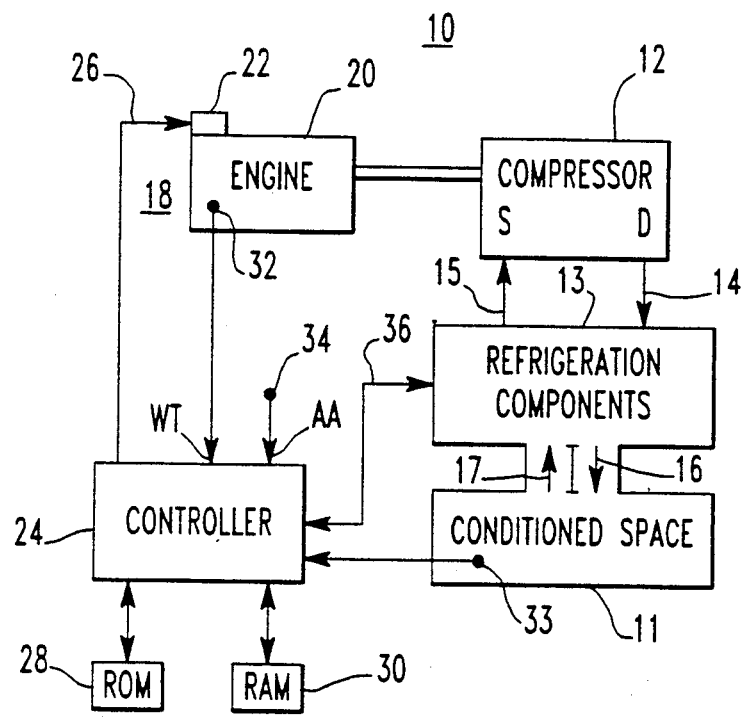
FIG.1A
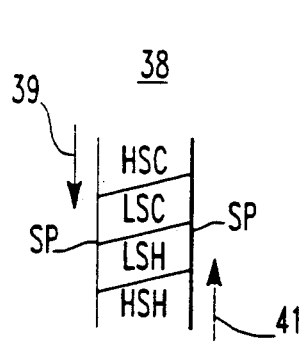
FIG.1B
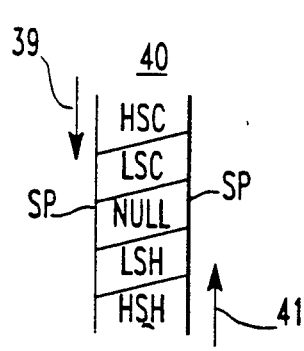
FIG.1C
| 44 |
|---|
| RAM MAP |
| ERF |
| LSTF |
| LSSFF |
| LST |
| DHSF |
| WT |
| AA |
FIG.3

METHOD OF STARTING AND RUNNING AN INTERNAL COMBUSTION ENGINE CONNECTED TO A REFRIGERANT COMPRESSOR

TECHNICAL FIELD

The invention relates in general to refrigeration systems, and more specifically to refrigeration systems in which a refrigerant compressor is driven by an internal combustion engine.

BACKGROUND ART

It is common in transport refrigeration systems, such as transport refrigeration systems for use in trucks, trailers, containers, and the like, to drive a refrigerant compressor with an internal combustion engine, such as a diesel engine. It is also common to operate the engine at one of first and second engine speeds, such as 1400 RPM and 2200 RPM, called low speed and high speed, according to a temperature control algorithm. The engine is started at low speed, and as soon as it reaches low speed operation, the temperature control algorithm takes over, switching the engine to high speed, if required by the temperature control algorithm. The engine may be operated continuously, switching between cooling and heating modes to hold a selected set point temperature in a served space, or the engine may be operated in a start-stop mode, being stopped in a predetermined NULL temperature band adjacent to the selected set point temperature. During initial temperature pull down the temperature control algorithm normally operates the engine at high speed, in a high speed cool mode, and the engine speed is switched to low speed when the temperature of the served space has been dropped to a predetermined point adjacent to the selected set point temperature. The engine will then be operated in low speed cooling and heating modes, unless the ambient is at a temperature extreme which moves the temperature of the served space out of the low speed operating ranges to high speed cool or high speed heat portions of the temperature control algorithm.

An internal combustion engine in a transport refrigeration application is thus subjected to severe starting and stopping duty, especially when a start-stop temperature control algorithm is in control of the transport refrigeration system. Transport refrigeration systems must be highly reliable because they condition costly loads over-the-road where maintenance is not always quickly available. Thus, it would be desirable, and it is an object of the present invention, to reduce maintenance and prolong the useful operating life of the internal combustion engine in a transport refrigeration application.

SUMMARY OF THE INVENTION

Briefly, the present invention is a method of starting and running an internal combustion engine connected to drive a refrigerant compressor in a refrigeration system which operates the engine at predetermined first and second speeds in response to a predetermined temperature control algorithm, with the first speed being lower than the second speed. The method includes the steps of starting the engine at the first speed, preventing switching from the first to the second speed in response to the control algorithm during an initial dynamic delay period following the step of starting the engine, determining the length of the initial dynamic delay period as a function of at least one predetermined parameter of the engine, and selecting the at least one predetermined engine parameter during the initial dynamic delay period.

In a preferred embodiment of the invention, the method further includes the steps of sensing the temperature of the engine, and determining if the sensed engine temperature value is in a plausible temperature range. The step of selecting a predetermined parameter of the engine includes the steps of selecting the predetermined engine parameter from engine temperature and engine running time when the determining step determines the engine temperature value is in a plausible range. When the engine temperature value is not in a plausible range, the method further includes the steps of sensing ambient temperature, and determining if the sensed ambient temperature is in a plausible temperature range. The step of selecting the at least one predetermined parameter of the engine then includes the steps of selecting engine operating time when the determining steps determine that the sensed engine and ambient temperatures are not in plausible ranges, and selecting operating time of the engine as a function of ambient temperature when the sensed engine temperature is not in a plausible range and the sensed ambient temperature is in a plausible range.

BRIEF DESCRIPTION OF THE DRAWINGS

The invention will become more apparent by reading the following detailed description in conjunction with the drawings, which are shown by way of example only, wherein:

FIG. 1A is a block diagram of a refrigeration system which may be operated according to the methods of the invention;

FIG. 1B is a control algorithm which may be selected to operate the refrigeration system shown in FIG. 1A in a continuous mode;

FIG. 1C is a control algorithm which may be selected to operate the refrigeration system shown FIG. 1A in a start-stop mode;

FIG. 3 is a RAM (random access memory) map listing certain flags, timers and other variables used in the program of FIGS. 2A and 2B.

DESCRIPTION OF PREFERRED EMBODIMENTS

Figure 2A:
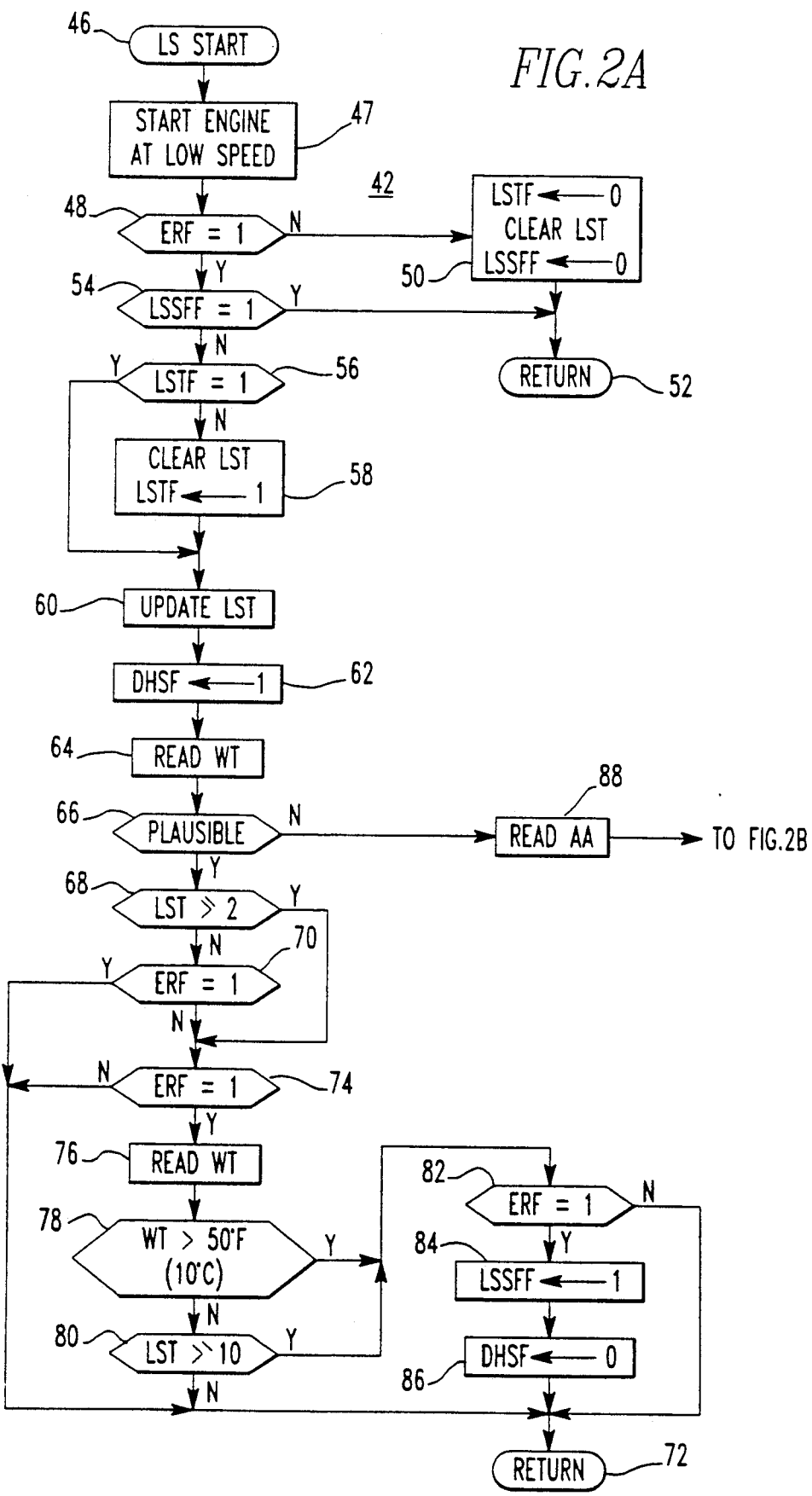
FIGS. 2A and 2B may be assembled to provide a flow diagram of a program which implements methods of the invention related to starting and running the internal combustion engine of FIG. 1A in an initial forced low speed operating mode which reduces maintenance and prolongs the useful operating life of the engine.

Referring now to the drawings, and to FIG. 1A in particular, there is shown a refrigeration system 10, such as a transport refrigeration system, which may be operated according to the teachings of the invention to condition the air of an associated served or conditioned space 11. Refrigeration system 10 includes a refrigerant compressor 12 having discharge and suction ports D and S, respectively, with the discharge and suction ports being connected to additional conventional components 13 of refrigeration system 10 via a hot gas line 14 and a suction line 15. Components 13 include a fan or blower which discharges conditioned air 16 into conditioned space 11, and which draws return air 17 from conditioned space 11. Refrigerant compressor 12 is driven by a prime mover arrangement 18 which includes an internal combustion engine 20. Engine 20 includes a solenoid operated throttle 22, which selects a first predetermined engine operating speed, such as 1400 RPM, when the solenoid is de-energized, and which selects a second predetermined engine operating speed, such as 2200 RPM, when the solenoid is energized. Solenoid operated throttle 22 is controlled by a controller 24, as indicated by control line 26, with controller 24 preferably being a microprocessor based controller having a read-only-memory (ROM) 28 for storing application programs, and a random-access-memory (RAM) 30 for storing various program variables while application programs stored in ROM 28 are being run. Controller 24 senses the operating temperature WT of engine 20 via a temperature sensor 32, such as by sensing the temperature of engine coolant when engine 20 is a liquid cooled engine. Controller 24 also senses the temperature of conditioned space via a temperature sensor 33 and the temperature AA of the ambient air via a temperature sensor 34. Controller 24 additionally receives signals from, and provides output signals to, the refrigeration components 14, as indicated generally by control line 36.

Controller 24 operates refrigeration system 10 according to one or both of first and second temperature control algorithms 38 and 40 shown in FIGS. 1A and 1B, respectively. When both are utilized, one or the other is manually selectable via a selector switch. The first control algorithm 38 will start and operate engine 20 in a continuous mode, running a high speed cool mode HSC during initial temperature pull down of conditioned space 11. A falling temperature in conditioned space 11 is indicated along the left-hand side of each algorithm 38 and 40 by arrows 39, and a rising temperature in conditioned space 11 is indicated along the right-hand side of each algorithm by arrows 41 When the temperature of conditioned space approaches a selected set point temperature SP, algorithm 38 causes controller 24 to de-energize solenoid operated engine speed throttle 22 to drop the engine speed to low speed and operate refrigeration system 10 in a low speed cool mode LSC. When the temperature of conditioned space 11 is brought down to set point SP, operation switches to a low speed heat mode LSH. If the temperature drops far enough, controller 24 provides an output which energizes the solenoid controlled engine speed throttle 22, to switch to a high speed heat mode HSH. The selected set point temperature is maintained in conditioned space 11 by switching back and forth between the cooling and heating modes.

The second temperature control algorithm 40 introduces an additional mode NULL adjacent to the selected set point temperature SP, with engine 20 being switched on and off at certain of the temperature points which define the NULL band, thus conserving engine fuel.

Figure 2B:
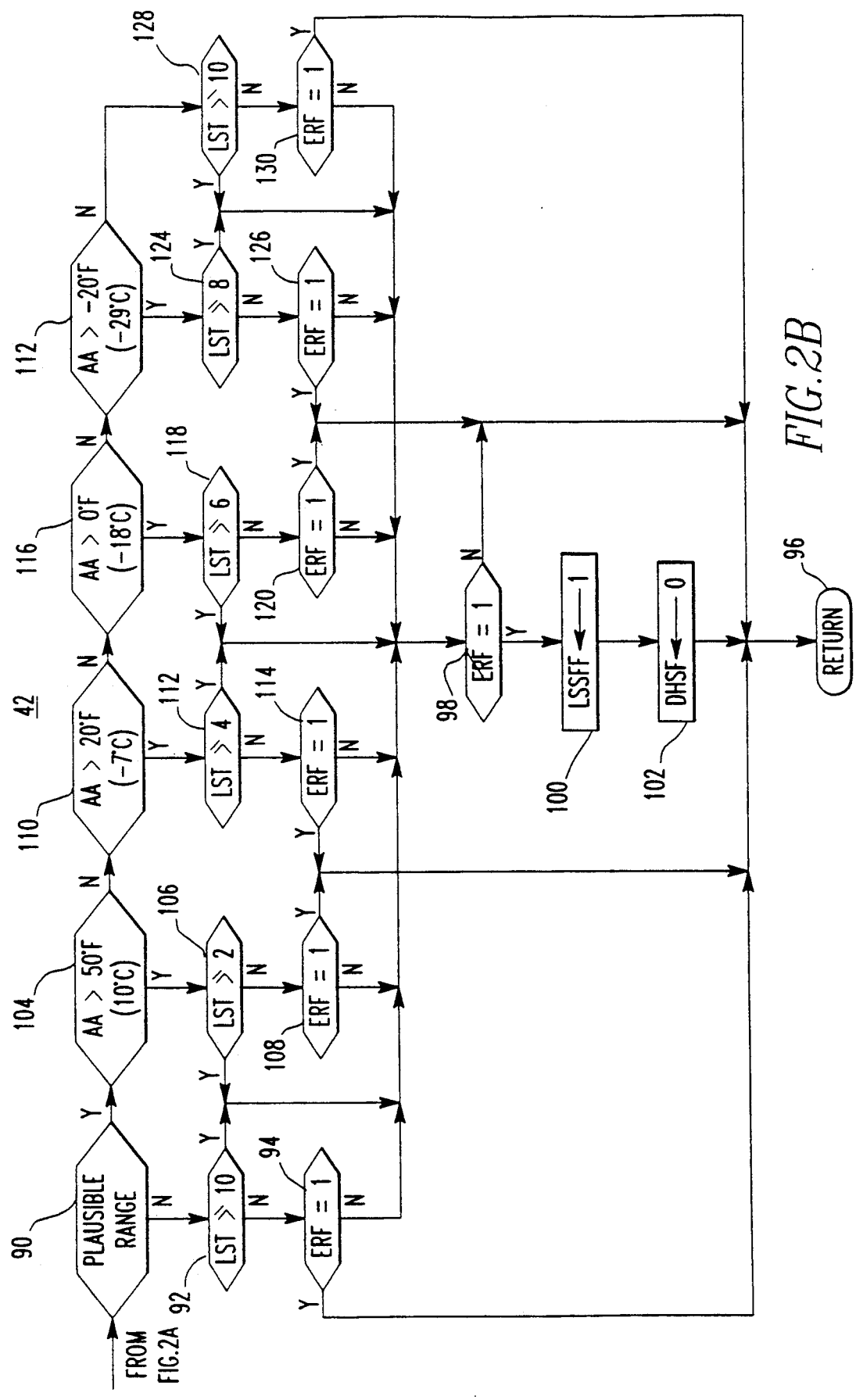

Regardless of which control algorithm 38 or 40 is controlling the operation of refrigeration system 10, the present invention operates engine 20 in a manner which reduces maintenance of engine 20 and extends its useful operating life. FIGS. 2A and 2B may be assembled to provide a flow diagram of a program 42 which implements the teachings of the invention. During the description of program 42 a RAM map 44 shown in FIG. 3 will also be referred to.

Program 42 is entered at 46 and step 47 ensures that engine 20, when started, will start and run at the lower of the hereinbefore mentioned two operating speeds, eg., 1400 RPM, by blocking or preventing the applicable control algorithm 38 or 40 from initiating an output to solenoid operated throttle 22, even when the controlling algorithm is calling for a high speed operating mode, eg., HSC or HSH. Step 47 may be performed by an engine start program stored in ROM 28 which automatically starts engine 20 at low speed while disabling an output to a high speed relay. Engine 20 may be started, for example, via an engine start program shown in U.S. Pat. 5,140,826, which patent is assigned to the same assignee as the present application. When engine 20 successfully starts, the engine start program sets a specific program flag to indicate that engine 20 is running. For example, an engine running flag ERF may be set to the logic one level, with flag ERF being indicated in the RAM map 44 of FIG. 3.

Step 48 checks the level of engine running flag ERF to make sure engine 20 is running. If flag ERF is reset, ie., at the logic zero level, step 48 goes to step 50 which clears a low speed timer LST maintained in RAM 30, it resets a low speed timer flag LSTF, and i resets a low speed start finished flag LSSFF. Program 42 then exits at 52, and program 42 stays in this loop until step 48 finds that engine 20 is running.

When step 48 finds engine 20 running, step 54 checks the logic level of the low speed start finished flag LSSFF. Since the forced low speed start of the invention will not have been finished at this point, flag LSSFF will be a logic zero and step 54 proceeds to step 56 which checks the logic level of the low speed timer flag LSTF. At this point flag LSTF will be reset or a logic zero, and step 58 clears low speed timer LST and sets low speed timer flag LSTF. Step 60 updates the low speed timer LST, and step 62 sets a disable high speed flag DHSF, which prevents any other operational program in ROM 28 from switching the speed of engine 20 from low speed to high speed.

Step 64 reads the input from temperature sensor 32 to determine the temperature WT of engine 20. Temperature sensor 32 may be disposed to measure the temperature of the engine's liquid coolant, or at any other suitable location which will provide an accurate indication WT of engine operating temperature. Step 66 determines if the value of WT is in a plausible range. Step 66 may perform the necessary diagnostic tests of sensor 32; or, a sensor diagnostic program may be used which sets a separate sensor fail flag for each sensor found to be faulty. A suitable sensor diagnostics program is set forth in U.S. Pat. 5,123,253, which patent is assigned to the same assignee as the present application. If a sensor diagnostic program is used, step 66 would check the sensor fail flag associated with temperature sensor 32.

If step 66 finds sensor 32 is functioning properly, step 68 fetches the latest updated value of low speed timer LST and compares it with a minimum engine running time value, such as two minutes. The minimum engine running time value assures that engine 20 will be forced to run at low speed for a predetermined period of time after start up, regardless of the temperature of engine 20. Prior to the expiration of the forced minimum low speed running time, step 74 checks the engine running flag ERF to make sure engine 20 is still running, and step 74 exits program 42 at 72.

At the expiration of the minimum low speed running time step 68 proceeds to step 74, as does step 70 should step 70 find that engine 20 is no longer running. Step 74 determines which of these two events occurred by checking the engine running flag ERF. If engine 70 is no longer running, step 74 proceeds to program return 72. If step finds engine 20 is running, then it indicates that the minimum low speed running time has expired. When step 70 finds engine 20 running, step 76 reads the engine temperature WT and step 78 compares the value of WT with a predetermined minimum temperature value, such as 50° F. (10 ° C.). The predetermined minimum temperature value is selected as being the minimum temperature for the specific engine 20 utilized which will assure that engine 20 may be switched to high speed operation without deleteriously affecting the life of engine components. If the temperature WT of engine 20 has reached the minimum high speed running temperature by the end of the initial two minute minimum low speed running time, the combination of the two minute low speed running time and an engine temperature WT at or above the minimum desired temperature for enabling high speed operation, engine 20 may be safely enabled for high speed operation.

Should step 78 find the engine temperature WT exceeds this predetermined minimum temperature value, step 78 proceeds to step 82 which checks the engine running flag ERF to make sure engine 20 is still running. If engine 20 is not running, program 42 exits at 72. If engine 20 is running, step 84 sets flag LSSFF to indicate that the low speed start and run of engine 20 has been successfully completed. Step 86 then resets the disable high speed flag DHSF, which unblocks the switching of engine 20 to high speed operation, ie., it enables the operative temperature control algorithm 38 or 40 to switch engine 20 to high speed, if required by the algorithm. Program 42 then exits at 72, and upon each subsequent running of program 42 step 54 will find flag LSSFF set and program 42 will exit at 52.

When step 78 finds that engine 20 has not reached the minimum desired temperature for high speed operation, a phase of program 42 is entered which determines if engine temperature WT or engine running time will be used to enable high speed operation of engine 20. This phase is implemented by steps 76, 78 and 80, with step 76 reading the latest engine temperature WT on each running of program 42. Step 78 compares the latest engine temperature WT with the predetermined minimum high speed run temperature, and when the engine temperature WT has not reached this minimum value, step 80 fetches the latest updated engine running time LST and compares it with a maximum desirable low speed running time, such as ten minutes. Until the engine temperature WT reaches the predetermined minimum value, or the engine running time reaches ten minutes, which ever occurs first, step 80 continues to proceed to the program return 42.

When one of the two program loop breaking events occurs, program 42 goes to step 82, ie., the "yes" branches of steps 78 and 80 both proceed to step 82. Step 82 makes sure engine 20 is still running, and if it is, steps 84 and 86 respectively terminate the low speed start and run of engine 20, and enable the controlling temperature control algorithm to switch engine 20 to high speed operation, when required. Thus, high speed operation may be initiated after the two minute minimum low speed operating time when the engine temperature WT is above a predetermined minimum value at the end of the minimum running time; it may be initiated any time between the two minute minimum low speed running time and the ten minute maximum low speed running time by the temperature WT of engine 20 reaching the minimum high speed temperature; and, it may be initiated by the ten minute maximum desirable low speed operating time. The ten minute maximum low speed operating time, in addition to getting engine 20 ready for high speed operation, prevents a faulty engine temperature sensor 32, not detected in step 66, from hanging up operation of refrigeration system 10 in low speed.

Should step 66 detect faulty operation of engine temperature sensor 32, engine temperature WT is eliminated as one of the parameters used in deciding the length of initial low speed operation of engine 20. Step 66 proceeds to step 88 which reads the ambient temperature AA as sensed by ambient temperature sensor 34. Step 90 determines if sensor 34 is functional, or faulty, such as by checking an associated ambient temperature sensor fail flag as described relative to step 66. Should step 90 find temperature sensor 34 to be faulty, it indicates that both the engine temperature sensor 32 and the ambient temperature sensor 34 are both faulty, and low speed operation is determined by the maximum desirable low speed operating time. In the event both sensors 32 and 34 are faulty, program 42 goes into a loop comprising steps 92, 94 and 96 until the maximum low speed running time expires, or engine 20 is shut down, whichever occurs first. Step 92 fetches the latest time value of low speed timer LST and compares this value with the maximum desirable low speed running time value, eg., ten minutes. If the low speed running time has not reached ten minutes, step 94 checks engine running flag ERF, and if engine 20 is running program 42 exits at 96.

When this program loop is broken by step 92 finding that the maximum low speed running time has expired, or by step 94 finding that engine 20 has been shut down, step 98 determines which event broke the loop by again checking engine running flag ERF. If engine 20 has been shut down, step 98 exits program 42 at program return. 96. Each subsequent running of program 42 will then simply loop through the hereinbefore described steps 46, 48 50 and 52. When the program loop is broken by the maximum desirable running time at low speed being reached, step 98 proceeds to step 100 which sets the low speed start finished flag LSSFF, step 102 resets the disable high speed flag DHSF, and program 42 exits at 96.

When step 90 finds ambient temperature sensor 34 functional, program 42 initiates a phase in which forced low speed running time is a function of ambient temperature AA, with the higher the ambient temperature the lower the forced low speed running time, and conversely, the lower the ambient temperature the longer the forced low speed running time.

More specifically, step 90 proceeds to step 104 which fetches the latest value AA of ambient temperature being provided by ambient temperature sensor 34. Step 90 compares the value AA with a first temperature value, such as 50° F. (10° C.). If the ambient temperature AA exceeds this first temperature value, engine 20 is operated for a first minimum low speed running time, such as two minutes. This is accomplished by steps 106 and 108, with step 106 fetching the engine running time from low speed timer LST and comparing the running time with two minutes. If the engine running time has not reached two minutes, and engine 20 is still running, as determined by step 108, which checks engine running flag ERF, program 42 exits at 96. When the engine running time reaches two minutes, or engine 20 is shut down, the program loop is broken and the "yes" and "no" branches of steps 106 and 108, respectively, proceed to step 98, which determines which event broke the loop. If engine 20 is running, step 98 proceeds to steps 100 and 102 which respectively set the low speed start finished flag LSSFF, and reset the disable high speed flag DHSF, and program 42 exits at 96.

When step 104 finds that the ambient temperature AA does not exceed the first ambient temperature value, step 110 determines if it exceeds a second and lower ambient temperature value, such as 20° F. (−7° C.). If step 110 finds the ambient temperature AA is between the first and second ambient temperature values, step 112 determines if engine 20 has been running at low speed for a second and longer time value, such as four minutes. Steps 112 and 114 set up a loop similar to the loop described relative to steps 106 and 108, and when the loop is broken the step which broke the loop proceeds to the hereinbefore described steps 98, 100, 102 and 96.

When step 110 finds that the ambient temperature AA does not exceed the second ambient temperature value, step 116 determines if it exceeds a third and still lower ambient temperature value, such as 0° F. (−18° C.). If step 116 finds the ambient temperature AA is between the second and third ambient temperature values, step 118 determines if engine 20 has been running at low speed for a third and still longer time value, such as six minutes. Steps 118 and 120 set up a program loop similar to the loop described relative to steps 106 and 108, and when the loop is broken the step which broke the loop proceeds to the hereinbefore described steps 98, 100, 102 and 96.

When step 116 finds that the ambient temperature AA does not exceed the third ambient temperature value, step 122 determines if it exceeds a fourth and still lower ambient temperature value, such as −20° F. (−29° C.). If step 122 finds the ambient temperature AA is between the third and fourth ambient temperature values, step 124 determines if engine 20 has been running at low speed for a fourth and still longer time value, such as eight minutes. Steps 124 and 126 set up a program loop similar to the loop described relative to steps 106 and 108, and when the loop is broken the step which broke the loop proceeds to the hereinbefore described steps 98, 100, 102 and 96.

When step 122 finds that the ambient temperature AA does not exceed the fourth temperature value, step 122 proceeds to step 128 which compares the engine running time LST with the maximum desirable low speed running time value, eg., ten minutes. Step 128 proceeds to step 130 which makes sure engine 20 is still running by checking the engine running flag ERF, and program 42 loops from return 96 back to entry 46 on a timed basis, until step 128 finds the maximum forced low speed operating time has been reached, or step 130 finds engine 20 no longer running. When the loop is broken by either step 128 or 130, step 98 determines which event occurred, exiting at program return 96 when step 98 finds engine 20 no longer running, and proceeding to steps 100 and 102 when engine 20 is running, to set the low speed start finished flag LSSFF and to reset the disable high speed flag DHSF, respectively.

In summary, there has been disclosed new and improved methods for starting and running an internal combustion engine 20 connected to drive a refrigerant compressor 12 in a refrigeration system 10. Upon start up, engine 20 is forced to operate at the lower of two selectable operating speeds. It is not known at the moment of start up exactly which engine operating parameter, or parameters, will result in terminating the forced low speed operation and the enabling of high speed operation. High speed operation of engine 20 may be enabled by a combination of minimum engine running time and engine temperature WT; high speed operation of engine 20 may be enabled on the basis of engine temperature WT alone after a predetermined minimum low speed operating time has expired; high speed operation of engine 20 may be enabled after the expiration of a fixed low speed running time alone; and high speed operation of engine 20 may be enabled after the expiration of a dynamically determined low speed running time which is inversely proportional to ambient temperature. The methods of the invention decide which parameter, or parameters, will be determining, based upon the present operating conditions of engine 20 and applicable temperature sensors 32 and 34.

We claim:

1. A method of starting and running an internal combustion engine connected to drive a refrigerant compressor in a refrigeration system which operates the engine at predetermined first and second speeds in response to a predetermined control algorithm, with the first speed being lower than the second speed, comprising the steps of:
   starting the engine at the first speed,
   preventing switching from the first to the second speed in response to the control algorithm during an initial dynamic delay period following the step of starting the engine,
   determining the length of the initial dynamic delay period as a function of at least one predetermined parameter of the engine,
   and selecting the at least one predetermined engine parameter during the initial dynamic delay period.

2. The method of claim 1 wherein the determining step provides a predetermined initial first engine running time at the first speed, and including the steps of:
   sensing the temperature of the engine,
   comparing the temperature of the engine with a predetermined temperature value when the predetermined initial first engine running time expires,
   enabling switching from the first to the second speed when the temperature of the engine has reached the predetermined temperature value at the expiration of the predetermined initial engine running time,
   continuing the step of preventing switching from the first to the second speed when the temperature of the engine has not reached the predetermined temperature value at the expiration of the predetermined initial first engine running time,
   and enabling the switching from the first to the second speed when the temperature of the engine reaches the predetermined temperature value, or at the end of a second predetermined engine running time, whichever occurs first.

3. The method of claim 1 including the steps of:
   timing the operation of the engine after the step of starting the engine at the first speed,
   sensing the temperature of the engine,
   detecting when the temperature of the engine reaches a predetermined temperature value,
   and detecting when the step of timing the operation of the engine reaches a predetermined time value,
   with the step of selecting the at least one predetermined engine parameter selecting engine temperature when the temperature of the engine reaches the predetermined temperature value before the engine operating time reaches the predetermined time value, and selecting engine running time as the at least one predetermined engine parameter when the engine operating time reaches the predetermined time value before the temperature of the engine reaches the predetermined temperature value.

4. The method of claim 3 including the step of enabling the switching of engine speed from the first to the second speed when the at least one predetermined parameter of the engine is selected.

5. The method of claim 3 wherein the internal combustion engine is cooled by a liquid coolant, with the step of sensing the temperature of the engine sensing the temperature of the liquid engine coolant.

6. The method of claim 1 including the steps of:
sensing the temperature of the engine,
and determining if the sensed temperature is in a plausible temperature range,
with the step of selecting the at least one predetermined parameter of the engine selecting operating time of the engine when the determining step determines that the sensed temperature is not in a plausible range,
and otherwise selecting the temperature of the engine as the at least one predetermined parameter of the engine.

7. The method of claim 1 including the steps of:
sensing the temperature of the engine,
determining if the sensed engine temperature is in a plausible temperature range,
with the step of selecting a predetermined parameter of the engine selecting the predetermined engine parameter from engine temperature and engine running time when the determining step determines the engine temperature is in a plausible range,
sensing ambient temperature when the determining step finds the sensed engine temperature is not in a plausible range,
and determining if the sensed ambient temperature is in a plausible temperature range,
with the step of selecting at least one predetermined parameter of the engine selecting engine operating time when the determining steps determine that the sensed engine and ambient temperatures are not in plausible ranges, and selecting engine operating time as a function of ambient temperature when the sensed engine temperature is not in a plausible range and the sensed ambient temperature is in a plausible range.

8. The method of claim 7 wherein the step of selecting the engine operating time as a function of ambient temperature includes the step of providing a plurality of different engine operating times, and selecting one of the plurality of engine operating times in response to the magnitude of the sensed ambient temperature value, with the selecting step selecting an engine operating time having a time value which is inversely proportional to the temperature value of the sensed ambient temperature.

* * * * *